Nov. 28, 1950 F. W. GREER 2,531,773
METHOD OF AND APPARATUS FOR CONDITIONING
CHOCOLATE AND THE LIKE
Filed Feb. 11, 1946 2 Sheets-Sheet 1
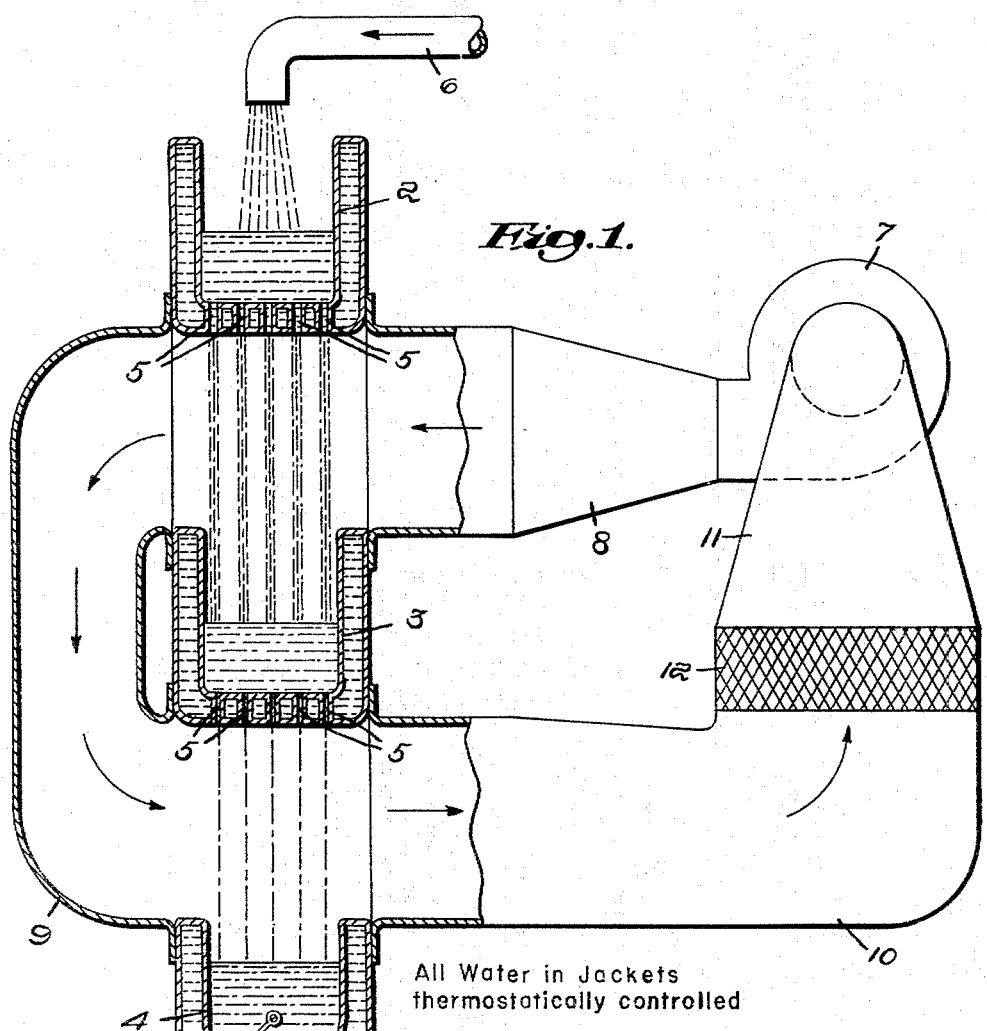
Fig. 1.
All Water in Jackets thermostatically controlled
Fig. 3.
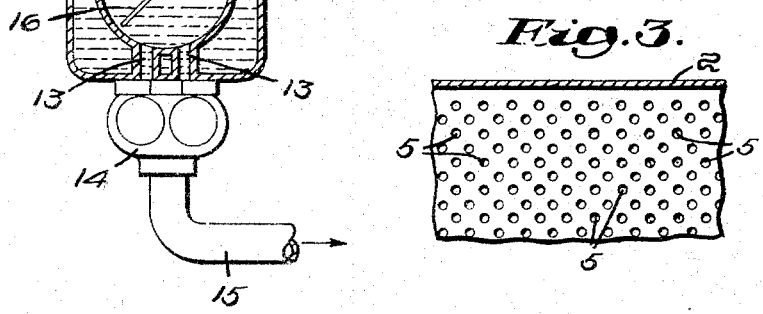
Inventor:
Frederick W. Greer,
by J. H. McCrady.
Attorney

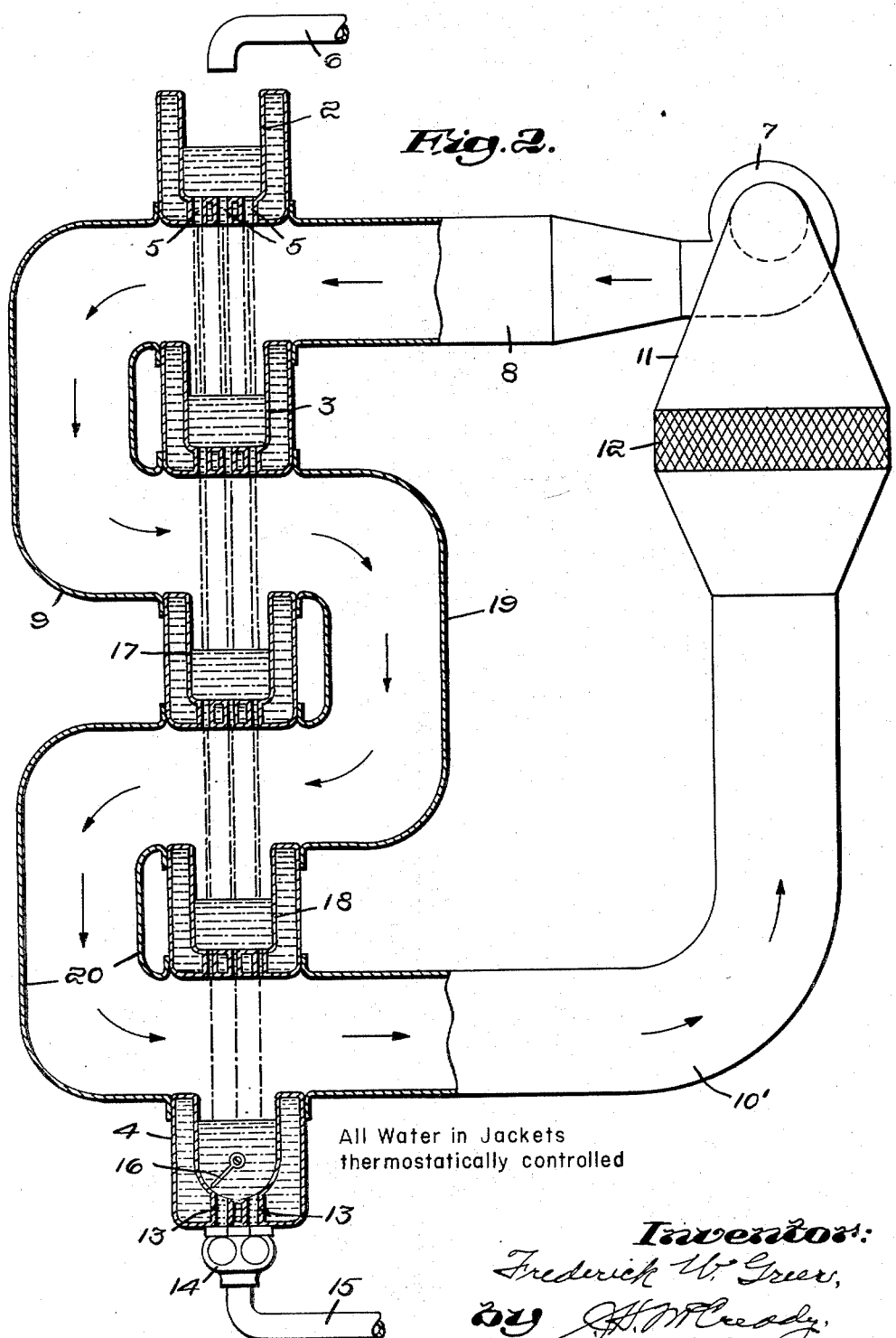

Patented Nov. 28, 1950

2,531,773

UNITED STATES PATENT OFFICE 2,531,773

METHOD OF AND APPARATUS FOR CONDITIONING CHOCOLATE AND THE LIKE

Frederick W. Greer, Belmont, Mass., assignor to J. W. Greer Company, Cambridge, Mass., a corporation of Massachusetts Application February 11, 1946, Serial No. 646,741

10 Claims. (Cl. 261—11)

1

This invention relates to methods of and apparatus for tempering or conditioning melted chocolate for dipping, spreading, coating and similar operations. The most important step in this conditioning process is that of cooling the chocolate to the desired temperature, but when a true tempering of the chocolate is to be achieved, it is also necessary to include a heating step at about the end of the conditioning operation.

The various forms of apparatus heretofore used for cooling this material have depended on bringing the chocolate into contact with cooling surfaces. In all such apparatus it is necessary to scrape the cooled chocolate from these surfaces, and a serious objection to this type of apparatus is that the chocolate tends strongly to congeal not only on the cooling surfaces but also on the scrapers. This action makes it necessary to shut down at frequent intervals and clean up the whole apparatus.

A further difficulty experienced in using prior forms of chocolate cooling apparatus is that the crystallization of the chocolate, which occurs when it congeals, introduces highly objectionable variations in the consistency of the final product.

The present invention aims to improve both the methods of cooling chocolate and also the apparatus for performing this operation with the object of overcoming the foregoing objections. It will be evident, however, that this invention is also applicable to the cooling of syrups and other viscous liquids used in the confectionery and baking industries.

The nature of the invention will be readily understood from the following description when read in connection with the accompanying drawings, and the novel features will be particularly pointed out in the appended claims.

In the drawings,

Fig. 1 is a diagrammatic view showing, partly in vertical section and partly in side elevation, an apparatus constructed in accordance with this invention;

Fig. 2 is a similar view showing another apparatus with which the process of this invention may be performed; and Fig. 3 is a plan view of a portion of the bottom of one of the chocolate receptacles.

The method provided by this invention involves the steps of dispersing a stream of melted chocolate into a finely divided state and cooling the dispersed stream so produced by blowing cool air through it.

Referring to Fig. 1, the construction there

2 shown comprises a series of receptacles indicated, respectively, at 2, 3 and 4, supported, one above another, and so disposed that the melted chocolate flows by gravity through the entire series. In the particular construction shown, each receptacle is made in the form of an elongated tank; is water-jacketed; and each of the two upper tanks is provided with a series of outlet tubes, staggered as shown in Fig. 3, through which the liquid chocolate is discharged in small individual streams. In a typical installation the tanks are approximately eight inches wide, twelve inches deep, and four feet long, and the bores of the tubes 5 are in the neighborhood of a quarter of an inch in diameter. Because of the viscosity of the chocolate, the streams flowing through these individual tubes usually are not more than an eighth of an inch in diameter. The distance between adjacent tanks may be in the neighborhood of twelve inches. It will be understood, however, that these dimensions would be varied to suit the requirements of different situations and the character of the material being cooled.

Chocolate is pumped from the melting kettle through the pipe 6 into the uppermost receptacle 2 and flows in what, generally speaking, is a continuous stream through the middle tank into the lowermost receptacle 4. In those sections between adjacent tanks where the main stream is broken up or dispersed into a multiplicity of small streams, a circulation of cool air is maintained by means of a blower 7 and conduit sections 8, 9, 10 and 11. Between the sections 10 and 11 the air flows through refrigerating coils or a refrigerating section 12 where it is cooled before being delivered to the intake of the pump 7. Thus a closed air cooling circuit is established. Obviously the rate of circulation of air should not be sufficiently high to prevent accurate control of the free falling streams of chocolate.

All of the water jackets are thermostatically controlled, and this is also true of the refrigerating section 12. The melting point of the chocolate is about 84° F. and it does not flow well even at higher temperatures under 87° F. In a typical installation the melted chocolate is pumped through the pipe 6 at approximately 110° F., at which temperature it flows very freely, and this temperature will be maintained in the tank 2. A drop of 10° F. can readily be obtained in the first air space between the tanks 2 and 3, and a good operating condition, therefore, is to maintain the chocolate in the middle tank 3 at about 100° F. Another drop of 10° F. can easily be made to occur between the tanks 3 and 4, and for some purposes a temperature of 90° F. in the latter tank is entirely satisfactory. From the bottom of this tank outlets 13 conduct the cooled chocolate into a pump 14, which may be of the intermeshing gear type, and the latter forces the liquid through a discharge pipe 15 leading to the depositor, dip tank, or other apparatus in which the chocolate is to be used. Preferably a rotary or oscillating stirrer 16 is mounted in the delivery tank 4, where it serves to agitate the chocolate and keep it in a homogeneous condition.

In this relatively simple form of apparatus, therefore, the desired degree of cooling can be achieved without relying at all upon cooling surfaces and with the complete elimination of scrapers. The freedom from contact of the chocolate with solid cooling surfaces is important for the reasons pointed out in the introductory portion of this specification. Since the temperatures of both the cooling air and that of the chocolate at different points in the process can be thermostatically controlled, the apparatus functions with a minimum of attention. Elimination of scrapers is not only an important advantage because it does away with the scrapers themselves and their objectionable action on the chocolate, as above described, but also because it eliminates the driving mechanism for them and the bearings necessary to support the shafts for operating them. In prior art forms of chocolate cooling apparatus such bearings have been the source of much trouble because of the impossibility of lubricating them at the points where they are in contact with the chocolate.

When the chocolate is to be tempered as, for example, preparatory to using it in the hand-dipping of the centers of chocolate coated confectionery, it is necessary to cool the chocolate to about 86° F. and then to raise the temperature again to a somewhat higher point. This tempering operation can readily be performed in the apparatus shown, as for example, by so adjusting the cooling rate in the two steps that the chocolate will drop into the delivery tank 4 at about 86° F. and the temperature will be raised to 88° F. or 90° F. in that receptacle, or else during its flow through the discharge pipe 15, which may be jacketed for this purpose.

When it is desirable, for any reason, to use additional stages of cooling, the arrangement above described may be modified by the addition of one or more stages of cooling between the receptacles 3 and 4. Fig. 2 shows two such additional tanks at 17 and 18, respectively, and conduit sections 19 and 20 provided to conduct the air around the latter receptacles and into a return conduit section 10' which leads it back to the sections 12 and 11 and to the blower 7.

In such an arrangement as that shown in Fig. 2, and even in Fig. 1, it may be advantageous to vary the diameters of the tubes through which the chocolate is discharged from the respective tanks, and this naturally will be done to suit the requirements of the particular material being run and the results desired. In some cases the tubes handling the upper part of the stream will be made larger than those in the lower tanks, but in other cases, particularly in handling chocolate, it will be found advantageous to vary the size in a reverse manner because of the greater fluidity of the chocolate at the higher temperatures. In other words, the fact that more of it will flow through a quarter-inch tube at 110° F. than at 90° F. calls for some increase in the size of bore of the tubes used in the lower receptacles, or else an increase in the number of tubes assuming, of course, that a constant volume of flow through all of the tanks is to be maintained. In some situations, however, it may be desirable to vary the tube size in order to give an added control over the rate of cooling at some stage or stages. These factors can be predetermined in accordance with the requirements of individual installations.

While I have herein shown and described preferred embodiments of my invention, it will be evident that the invention may be embodied in other forms without departing from the spirit or scope thereof.

Having thus described my invention, what I desire to claim as new is:

1. That improvement in methods of cooling melted chocolate comprising the steps of feeding the melted chocolate into a container, producing a gravity flow of the chocolate out of said container in a multiplicity of small streams of predetermined size falling across an air space and into a pool of chocolate, circulating cooling air through said space and around said small streams of chocolate, drawing said chocolate from said pool at approximately its rate of delivery to the pool, and maintaining the temperature of the chocolate in said container and in said pool at approximately predetermined values.

2. That improvement in methods of cooling melted chocolate comprising the steps of feeding the melted chocolate into a container, producing a gravity flow of the chocolate out of said container in a multiplicity of small streams of predetermined size falling across an air space and into a pool of chocolate, circulating cooling air through said space and around said small streams of chocolate, controlling the temperature of the chocolate in said container and in said pool to maintain it within approximately predetermined values, and maintaining the rate of flow of the cooling air through said space at such a value that it does not interfere with the free gravity fall of the small streams of chocolate through said space.

3. That improvement in methods of cooling melted chocolate comprising the steps of producing a vertical gravity flow of said chocolate, dispersing a section of the stream so produced into small individual streams closely associated but spaced apart, blowing cool air through the section of the stream so dispersed, at the bottom of said dispersed section collecting said individual streams in a pool of chocolate to form a subsequent section of said stream, so controlling the temperatures of said cooling air as to produce the desired degree of cooling, maintaining the temperature of the chocolate in both the initial section of said stream and in said pool at substantially predetermined values, recirculating said cooling air and refrigerating it during such recirculation.

4. That improvement in methods of cooling melted chocolate comprising the steps of producing a vertical gravity flow of said chocolate, dispersing a section of the stream so produced into small individual streams closely associated but spaced apart, blowing cool air through the section of the stream so dispersed, at the bottom of said dispersed section collecting said individual streams in a pool of chocolate to form a subsequent section of said stream, repeating said gravity flow, dispersing, cooling, and collecting steps in said stream below said pool, adjusting the temperature of the chocolate at said collecting points to maintain it at approximately the desired temperatures, drawing the chocolate from the final pool, and agitating it in said final pool while it is being withdrawn therefrom.

5. That improvement in methods of cooling melted chocolate comprising the steps of producing a gravity flow of the liquid chocolate in a space through which it falls freely, breaking up the free falling section of the stream into a multiplicity of small independent streams, circulating cooling air through said space, repeating said steps and, in the final cooling step, reducing the temperature of the chocolate below that desired in the end product, and subsequently raising the temperature of the chocolate to that desired.

6. In an apparatus for cooling melted chocolate, the combination of a plurality of receptacles positioned one above another in vertically spaced relationship, the upper of said receptacles having a bottom provided with a multiplicity of downwardly extending tubes through which the melted chocolate is discharged in small independent streams from the receptacle and is guided into positions such that it falls by gravity directly into the receptacle below it and through the intervening air space separating said receptacles, and means for circulating cooling air around and in contact with said free falling streams of chocolate, said upper receptacle being equipped with a water jacket through which said tubes extend.

7. In an apparatus according to preceding claim 6, a construction in which said air cooling means comprises a blower, a conduit cooperating therewith to form a closed air circuit, and refrigerating means in said circuit.

8. In an apparatus for cooling melted chocolate, the combination of a series of receptacles positioned one above another in vertically spaced relationship and each provided with a perforated bottom through which the chocolate flows by gravity from one receptacle to another directly under it in a multiplicity of small individual streams falling freely across the intervening air spaces separating adjacent receptacles, said receptacles being equiped with thermostatically controlled water jackets, and means for maintaining a current of cooling air flowing through said space and in contact with said dispersed streams of chocolate to cool the latter as it passes from one receptacle to another.

9. In an apparatus according to preceding claim 8, a construction in which the bottom receptacle of said series is equipped with an agitator.

10. In an apparatus for cooling melted chocolate, the combination of a plurality of receptacles positioned one above another in vertically spaced relationship, the upper of said receptacles having parts for guiding small streams of chocolate flowing from it into positions where they will fall by gravity directly into the receptacle below it through the intervening air space separating said receptacles, means for circulating cooling air around and in contact with said free falling streams, and means for maintaining the chocolate in said receptacles within substantially predetermined temperature limits at which it flows freely, said temperature maintaining means including water jackets for said receptacles.

FREDERICK W. GREER.

REFERENCES CITED

The following references are of record in the file of this patent:

UNITED STATES PATENTS

| Number | Name | Date |
|---|---|---|
| 1,402,043 | Boltshauser | Jan. 3, 1922 |
| 1,538,457 | Zoelly | May 19, 1925 |
| 1,606,363 | Gosline | Nov. 9, 1926 |
| 1,920,682 | De Saugy | Aug. 1, 1933 |
| 2,074,802 | Noble | Mar. 23, 1937 |
| 2,282,923 | Armbruster | May 12, 1942 |
| 2,306,192 | Spiselman et al. | Dec. 22, 1942 |